April 14, 1925.  
G. C. GEBHARDT  
CRANBERRY HARVESTER  
Filed March 5, 1920  
1,533,644  
3 Sheets-Sheet 1
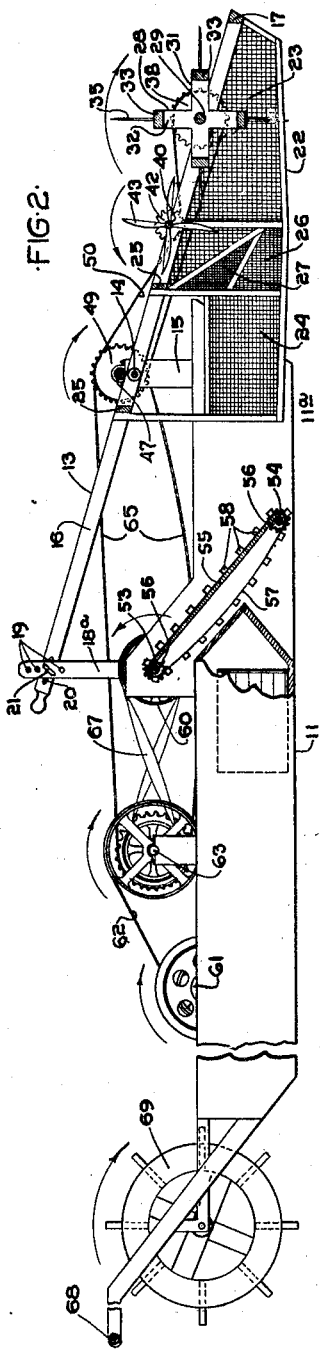
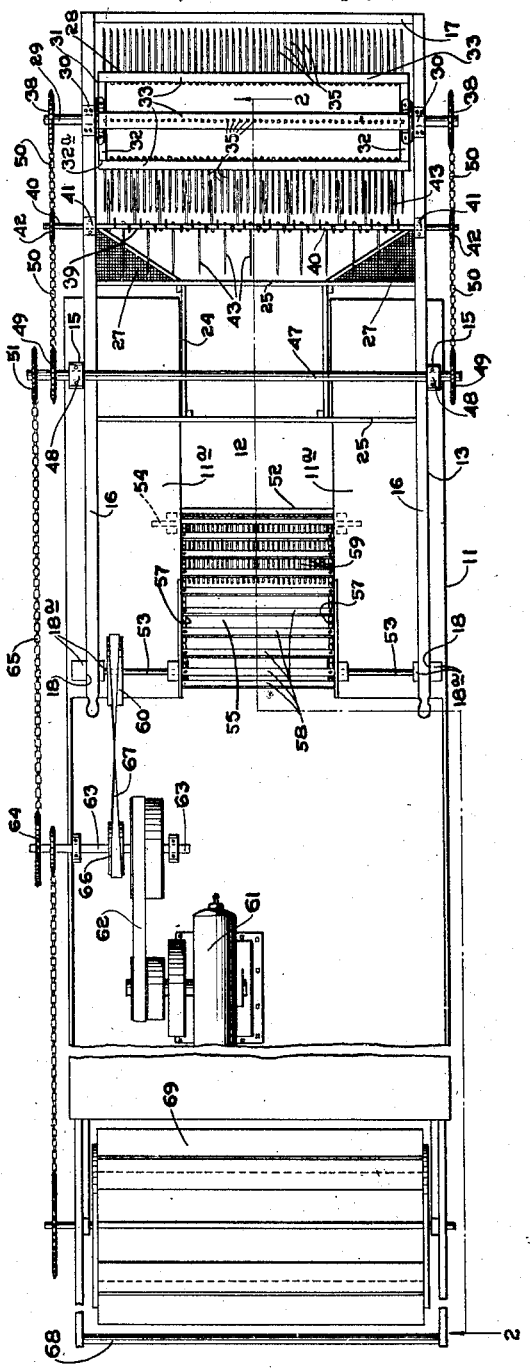
WITNESS:
INVENTOR:
GEORGE C. GEBHARDT
ATTORNEYS April 14, 1925.  
G. C. GEBHARDT  
CRANBERRY HARVESTER  
Filed March 5, 1920  
1,533,644  
3 Sheets-Sheet 2

WITNESS:  
R. L. Greist

INVENTOR  
GEORGE C. GEBHARDT  
BY Cromwell, Greist & Warden  
ATTORNEYS

April 14, 1925.
G. C. GEBHARDT
CRANBERRY HARVESTER
Filed March 5, 1920
1,533,644
3 Sheets-Sheet 3
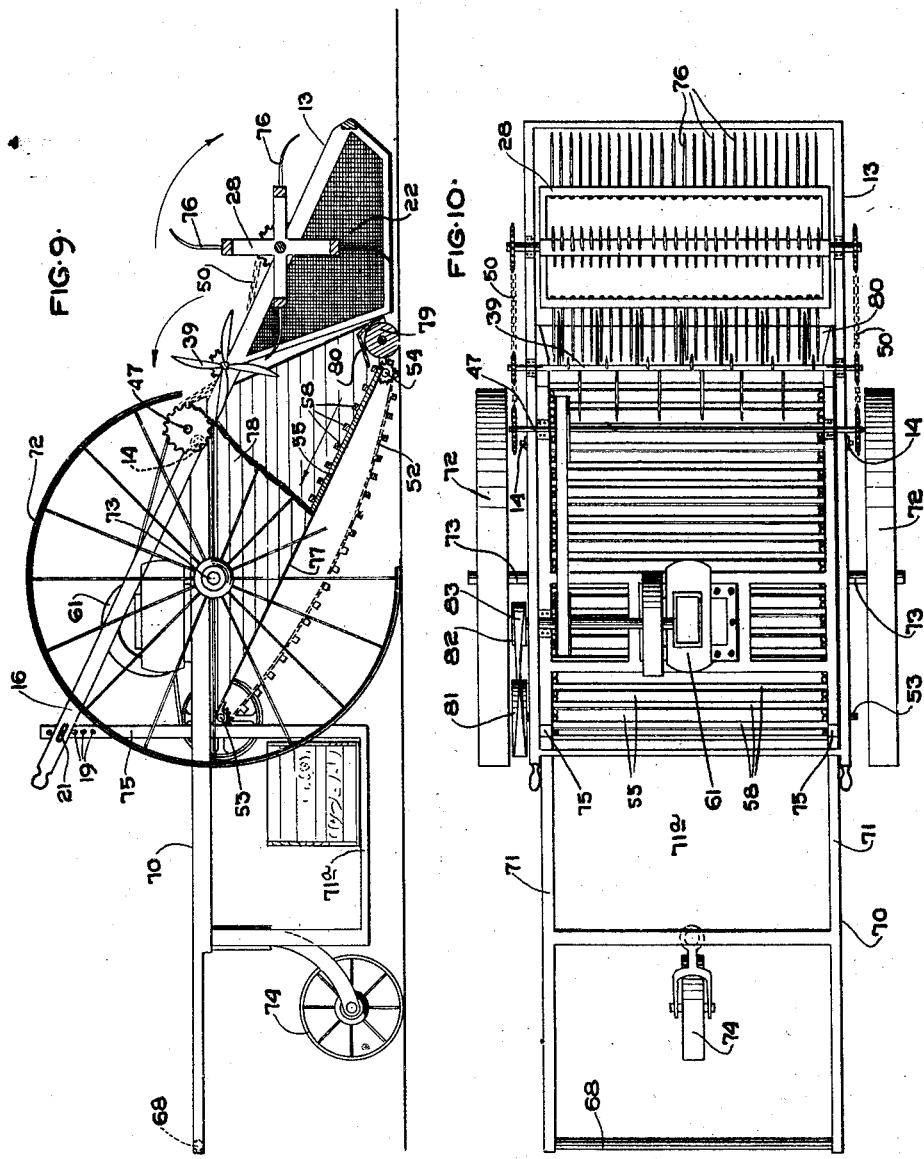
WITNESS:
INVENTOR:
GEORGE C. GEBHARDT
BY Cromwell, Greist & Warden
ATTORNEYS Patented Apr. 14, 1925.

1,533,644

UNITED STATES PATENT OFFICE.

GEORGE CHARLES GEBHARDT, OF MILLSTON, WISCONSIN.

CRANBERRY HARVESTER.

Application filed March 5, 1920. Serial No. 363,485.

*To all whom it may concern:*

Be it known that I, GEORGE C. GEBHARDT, a citizen of the United States, residing at Millston, in the county of Jackson and State of Wisconsin, have invented certain new and useful Improvements in Cranberry Harvesters, of which the following is a specification.

As is known, cranberries are grown in low bogs or marshes. Two general methods of cranberry growing are carried on. In the first, natural marshes are made use of, and the berries, when ripe for harvesting, are gathered by raking the bushes when the absence of natural inundation permits. In the second, artificial marshes are constructed, the bottoms of which are flat, to enable them to be flooded to a uniform depth when so desired for the purposes of growing and harvesting the berries. Cranberry bushes are quite small, varying from four to eight inches in height, and resembling matted swamp ferns. The foliage is thick, and covers the growing berries, which are attached to the bushes on thin vine-like stems. Because of the large amount of water required by cranberry bushes in cultivation the dykes which form the sides of the artificial sunken marshes are equipped with flood gates by means of which the berry beds or marshes may temporarily be inundated with water when so desired.

It has been the practice in the past, when the berries are ripe for harvesting, to flood the cranberry marshes with water to a depth of from six to twelve inches, sufficient to cover the bushes. Such inundation tends to untangle and lift the bushes, and the berries, being quite buoyant, rise towards the surface, though held from below by their stems. Men, equipped with hip boots, wade into the flooded berry beds, and by means of specially constructed hand scoops, which are open at one end and have comb-like bottoms, scoop up the berries, which, floating upon and beneath the surface of the water, are readily detached from their stems.

Such a method of harvesting the berries is undesirable for several reasons: It is very slow and many men are required; it is hard on the bushes and berries because of the trampling; and it is inefficient because by this method of harvesting great quantities of berries are passed over and over-looked.

The present invention contemplates the provision of a cranberry harvesting machine. One object of the invention is to provide a labor-saving device with which one man may, in an equal space of time, do the work heretofore accomplished by many. A second object is to provide a harvesting machine so mounted and operated that it will not destroy the cranberry beds. A third object is the provision of a machine which will operate efficiently to thoroughly remove and gather up the cranberries from the bushes over which the machine is directed in its movement. Further objects and advantages of the invention will appear as the nature thereof is better understood from the following detailed description.

In the accompanying drawings two embodiments are chosen to illustrate the application of the principles of the invention, it being understood that this selection is for purposes of illustration only and is therefore not to be considered as unnecessarily limiting the invention or the scope of the appended claims.

In the drawings—

Fig. 1 is a plan view of one embodiment of the device;

Fig. 2 is a side elevation, partly in section, on the line 2—2 of Fig. 1;

Fig. 9 is a side elevation, partly in vertical longitudinal section, of another embodiment of the device; and Fig. 10 is a plan view of the embodiment shown in Fig. 9.

Figure 3:
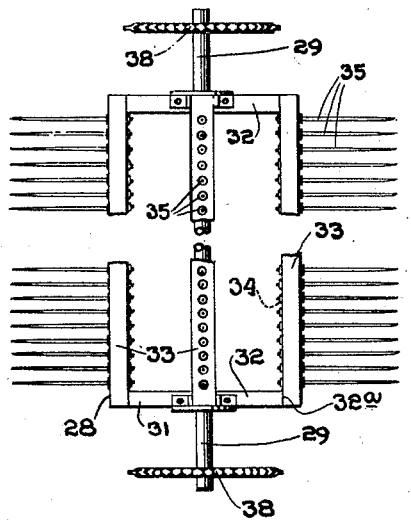
Fig. 3 is a detail view of the knocker wheel.

With specific reference to the embodiment as illustrated in Figs. 1 to 8 inclusive, the numeral 11 designates a scow upon which the harvesting device is mounted for the purpose of adapting said device to wet harvesting of cranberries. The scow is of light construction, preferably flat-bottomed and square-ended, and is bifurcated at its forward end and along its longitudinal axis to provide a rectangular recess 12, flanked on each side by the portions 11ª of the scow.

A frame 13 extends over and beyond the forward end of the scow, and is pivotally mounted at laterally opposed points 14 to vertical supports 15 which are fixed in the hull of the scow at its forward end, as shown. This frame is composed of two longitudinal members 16 and is braced laterally at its forward end by a cross member 17. Each of the rearward extremities of members 16 moves in a vertical slot 18, formed between a pair of upright parallel supports 18ª, which prohibits all but vertical motion of the frame members 16. These two sets of supports 18ª are rigidly positioned in the hull of the scow, at laterally opposed points rearward of the before mentioned supports 15. Each set of supports 18ª is perforated with a plurality of holes 19 as shown. A slot 20 is cut in the rearward extremity of each member 16, and a locking pin 21 is inserted through any pair of holes 19 and the slot 20, which is horizontally aligned therewith. By this means the forward end of frame 13 may be adjusted to any desired height with respect to the plane of the scow, and may in such a position be rigidly locked.

A screened frame 22 is attached to the forward portion of frame 13. Said screened frame has no forward end, rearward end, nor bottom but is composed of side walls alone. Screened frame 22 is symmetrical to the longitudinal axis of the scow, and resembles roughly from above an angular funnel. The foremost portion 23 of the screened frame is composed of two parallel vertical walls of irregular shape, depending rigidly from the forward ends of members 16. The rearmost portion 24 of said screened frame, which is contracted sufficiently in a lateral direction to be received by the forward portion of the recess 12 and to permit vertical movement in said recess, is composed of parallel side walls supported by cross braces 25 of frame 13. The central portion of the screened frame connects the forward and rear portions by a lower vertical portion of screening 26 and an upper obliquely positioned portion 27 which effectively screens the space between the foremost and rearmost portions 23 and 24 respectively. The lower edge of the screened frame 22 is substantially horizontal and extends to a point slightly above the level of the bottom of the scow.

A knocker wheel 28 is journaled on the forward portion of frame 13 at a point above and between the wider portions 23 of the screened frame 22. The shaft 29 of said wheel is mounted in suitable journal boxes 30 at laterally opposed points on members 16. A reel 31 is rigidly attached to said shaft. This reel is formed at each of its ends by two braces 32, bisecting each other at right angles. The shaft is securely positioned to the braces 32 at this point of intersection. The opposing ends of the reel are connected together by four parallel members 33 the ends of which are rigidly attached to corresponding extremities 32ª of the radial braces 32, thus forming a four-sided reel. Members 33 are shown as perforated at short uniform intervals throughout their lengths by small, radially directed holes 34. In each member 33 the axes of said holes are parallel and lie in the same plane at intervals advantageously of substantially one and one-quarter inches. Each of these holes receives a knocker wheel tooth 35. Said teeth are shown as short rods, preferably of metal and one-quarter inch square. Each tooth tapers to a blunt point at its outer end and near its inner end contains a rigid shoulder 36. From this shoulder to the inner end the tooth is round, and threaded to receive a nut 37. The cylindrical portion of said tooth is inserted in hole 34, and the nut 37 draws the shoulder 36 up against the outside of the reel member 33 thus holding the tooth in rigid engagement as shown in Fig. 3. Sprocket wheels 38 are keyed to shaft 29 at each of its ends, on the outside of journals 30, and form a means by which the knocker wheel may be rotated.

Figures 4, 5:
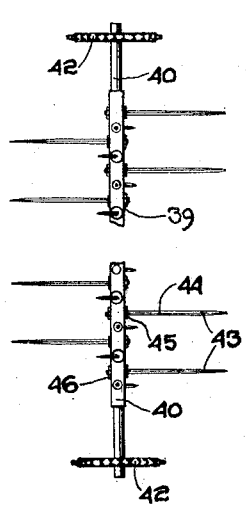
Fig. 4 is an enlarged detail view of a knocker wheel tooth.
Fig. 5 is a detail view of the cleaning wheel.
Figure 6:
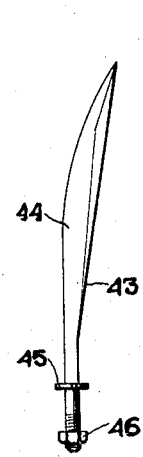
Fig. 6 is an enlarged detail view of a cleaning wheel blade.
Figure 7:
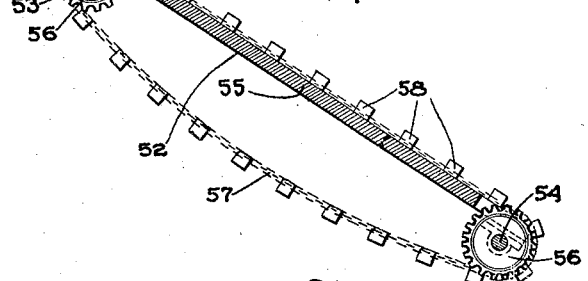
Fig. 7 is a side elevation in detail of the carrier.
Figure 8:
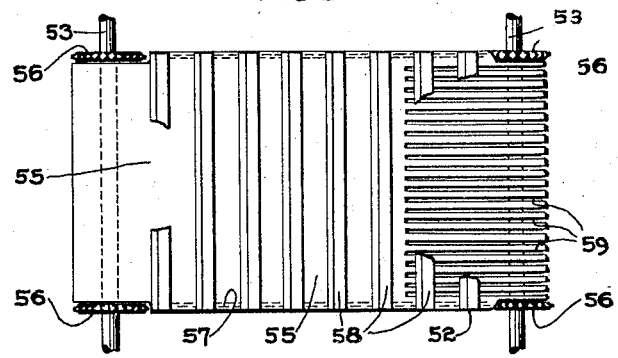
Fig. 8 is a plan view of carrier as shown in Fig. 7 with some of the slats broken away.

A cleaning wheel 39 is also mounted on frame 13. The shaft 40 of said wheel is parallel to shaft 29 and rotates in journal boxes 41 which are positioned on members 16, to the rear of knocker wheel 28. Small sprocket wheels 42 are keyed to shaft 40 at its ends to provide a means for rotating the cleaning wheel. Between the journals 41 shaft 40 becomes square and is apertured at regular intervals on its four faces to receive the cleaning blades 43. The axes of said holes are in planes perpendicular to shaft 40, and spaced apart a distance equal to the intervals between the axes of holes in the reel of knocker wheel 28. The axis of each hole in shaft 40 is at right angles to that of the adjacent hole, and the blades 43 are positioned in said holes in such a manner that the axis of each succeeding blade is set at right angles to that of the preceding one, thus giving to the cleaning wheel the character of a helix as shown in Fig. 5. Such an arrangement of the blades serves to prevent the clogging with debris of the cleaning wheel, since on each side of the shaft the blades are separated the distance of three blades. Said blades, as shown, are constructed with forward knife-like edges 44 which recede at their outer extremities from their path of motion in order to more readily throw off entangling debris. Near the inner end of each blade is a shoulder 45 for positioning said blade in its socket. From this shoulder to its inner end the blade is round and threaded to receive a nut 46 which secures the blade rigidly to its shaft.

The cleaning wheel 39 is disposed rearwardly of the knocker wheel 28 a sufficient distance to permit the blades of the former to intermesh with the teeth of the latter.

A power transmission counter-shaft 47, which is parallel to the axes of the cleaning and knocker wheels, is mounted in journal boxes 48 upon the heretobefore mentioned supports 15 preferably above and as closely adjacent the fulcrum 14 of the frame 13 as is practicable to allow the necessary tilting of said frame. Sprocket wheels 49 are keyed to shaft 47 near its extremities and in the same planes with sprockets 38 and 42. A drive chain 50 operatively engages these three sprockets on one or both sides of frame 13, and is applied in such manner as to give relatively opposite directions of rotation to the knocker and cleaning wheels, as shown in Fig. 2. Another sprocket wheel 51 is keyed to one end of shaft 47.

A carrier 52 is positioned in recess 12 of the scow. Said carrier operates as an endless conveyor between a shaft 53 rotatably mounted above the rear of recess 12 in the previously mentioned supports 18ª, and a shaft 54 mounted parallel to shaft 53 in the lower portion of recess 12 to the rear of the contracted portion 24 of the screened frame 22. An inclined apron 55 extends over and bridges the space between said shafts, and is rigidly secured at both sides to the walls of recess 12. Small sprocket wheels 56 are keyed to shafts 53 and 54 at the four corners of apron 55 and adjacent said walls. The carrier is composed of two endless chains 57 operating on sprockets 56 between said shafts, which chains are disposed at opposite sides of recess 12, and are joined together at intervals of preferably four or five inches by parallel slats 58 connected in such a way to the chains as to allow free movement of the chains over sprocket wheels 56. The lower portion of apron 55 is slotted longitudinally for substantially one-third of its length. The slots 59 are preferably about one-quarter inch wide, and occur at about one inch intervals, the purpose of said slots being to permit water to pass readily through the lower portion of the apron and to retain the berries. The slats 58 are supported by the apron, and when in operation travel upwardly along the inclined surface of said apron. A pulley 60, which is keyed to shaft 53 near one end, is the means by which the carrier is operated.

A power source 61, for instance a gasoline motor, is centrally positioned in the hull of the scow and transmits power through a belt 62 to an intermediate shaft 63. Said shaft, through the medium of a sprocket wheel 64 keyed thereto, and a chain 65, drives sprocket 51 on shaft 47 which in turn rotates the knocker and cleaning wheels, as hereinbefore described, in the directions shown by arrows in Fig. 1. A pulley 66 is also fastened rigidly to shaft 63 and by means of a crossed belt 67 operates the carrier through pulley 60 and shaft 53.

A handle 68, which projects out over the rear of the scow, is provided as a means whereby the scow may be moved through the water. A paddle wheel 69 may also be provided, and driven from the shaft 63 as illustrated, in order to assist in the propulsion of the scow.

The cranberry harvester operates as follows:

As before explained, the cranberry marsh is flooded sufficiently to cover the bushes with water and float the berries to the surface. The scow upon which the harvesting machine is mounted is pushed along the surface of the water by means of the handle 68 at the rear.

The power source 61 drives the knocker wheel, cleaning wheel, and carrier in the directions heretofore described. The height of the forward portion of frame 13 is adjusted to permit the bottom of the screened frame 22 and teeth of the knocker wheel when in their lowest position, to be submerged four or five inches below the surface of the water. As the knocker wheel rotates, the teeth strike the floating cranberries as well as those berries held below the surface, and detach the same from their stems. The berries immediately float to the surface, and, guided by the funnel-like side walls of the screened frame 22, enter the recess 12 of the scow. The carrier 52 is submerged at its forward end, and the berries as they float against the lower slotted portion are carried upwardly along the surface of said apron by the upwardly moving slats of the carrier. Upon reaching the upward termination of the apron the berries are raked therefrom by the slats into a suitable receptacle placed in the hull of the scow below the upward end of the conveyor.

The slots in the submerged forward portion of the apron allow the current of water to pass freely therethrough, thus avoiding a tendency of the water to eddy at this point which would disturb the floating movement of the berries onto the carrier apron.

As consecutive rows of teeth on the knocker wheel emerge from the water, they are intermeshed by the blades of the more rapidly rotating cleaning wheel, and any debris lodged on said teeth, such as leaves and stems, is effectually thereby removed. The cleaning wheel may be dispensed with where little debris is found, since the movement of the teeth of the knocker wheel tends by centrifugal action to throw off such debris.

A second embodiment of the invention is illustrated in Figs. 9 and 10, and represents an adaptation of the heretofore described mechanism to the dry harvesting of cranberries, where it is impossible or undesirable to inundate the marshes in which the berries are growing.

With particular reference to the above mentioned views 9 and 10, the numeral 70 designates a cart upon which the harvesting mechanism is mounted. Said cart is composed of a horizontal framework 71 which is supported by large wide wheels 72 upon an axle 73. The rear portion of framework 71 is centrally supported by a small caster wheel 74.

A frame 13, similar to that shown in the first embodiment, is pivoted at laterally opposed points 14 to the forward end of framework 71, and the height of the forward end of said frame is regulated by inserting pins 21 through the rear extremities of members 16 and holes 19 in two laterally opposed vertical supports 75 which are rigidly secured to framework 71.

Assembled with relation to frame 13, as in the first embodiment, are a knocker wheel 28, a cleaning wheel 39, and a power transmission counter-shaft 47. Said transmission shaft rotates the knocker and cleaning wheels by means of chains and sprockets as previously described, and is itself driven, as shown, by a power source 61 centrally located on framework 71.

Screened frame 22 is composed in this embodiment of only two parallel side walls, depending from the forward end of frame 13 on each side of knocker wheel 28. The teeth 76 of said knocker wheel differ from those in the first embodiment in that they are forwardly curved in a claw-like manner as illustrated in Fig. 9.

The carrier 52 operates between shafts 53 and 54. The apron 55, upon which the slats of the carrier move upwardly, extends between said shafts, and forms the bottom of a walled-in chute 77, depending from the central and forward portions of framework 71. The vertical side walls 78 of said chute are parallel and are so spaced apart as to be in longitudinal alignment with the walls of screened frame 22. The carrier is the full width of the cart and the chute.

A roller 79 is rotatably mounted in the lower forward portion of the chute. Said roller is immediately in front of shaft 54 and the lower termination of apron 55. A ridge-shaped shield 80 as illustrated in Fig. 9 extends between the side walls 78 of the chute and projects over the roller 79 and the lower portion of apron 55.

The forward edges of the side walls 78 are arranged closely adjacent the rear edges of screened frame 22, to form a practical continuation thereof.

The upper shaft 53 of the carrier is journaled in the framework 71 and is rotated by the power source 61 through pulleys 81, 82 and belt 83.

Inasmuch as this embodiment is not designed for use in wet harvesting, the apron 55 is not required to be slotted at its lower end.

An understructure 71ᵃ of framework 71 forms a platform under the rear discharging end of carrier 52, upon which a receptacle for receiving the berries from the carrier may be placed.

A handle 68 is disposed at the rear end of the cart framework, and is the means by which the harvesting machine may be propelled over the cranberry beds.

This embodiment operates as a dry harvesting machine in the following manner:

The power source 61 drives the knocker wheel, cleaning wheel and carrier in the directions heretofore explained. The machine is pushed along and guided by means of handle 68 at the rear. The claw-like teeth of the knocker wheel comb through the bushes as they are passed over, and detach and carry the berries in a similar way as might be accomplished by the downward and rearward movement of one's hand with the fingers slightly separated and curved.

The berries, being thus scooped up, are tossed rearwardly by the curved teeth onto the surface of apron 55 over the shield 80, which is positioned immediately to the rear of the path of teeth 76 in their rotation. Due to the ridge-like shape of said shield, any berries which may fall thereon roll rearwardly onto the lower surface of the apron.

The upwardly moving slats 58 of the carrier convey the berries deposited upon the apron to the elevated rear end of the carrier and there rake them into a suitable receptacle on platform 71ᵃ.

The cleaning wheel functions as before to remove debris accumulating between the teeth of the knocker wheel.

I claim:

1. In a machine for harvesting cranberries and the like, a vehicle, a frame mounted thereon for movement in a vertical plane, a knocker wheel carried by the frame and provided with a plurality of series of radial teeth to comb the bushes, an apron disposed at the rear of the knocker wheel, a carrier moving to the rear over the apron and in contact therewith to receive the berries dislodged by the wheel and carry the same rearwardly and means to drive the knocker wheel and the carrier.

2. In a machine for harvesting cranberries and the like, a vehicle, a frame mounted thereon for tilting movement in a vertical plane, a knocker wheel mounted at the forward end of the tilting frame and provided with a plurality of series of radial teeth to comb the bushes, an apron disposed at an upward inclination at the rear of the knocker wheel, a carrier moving to the rear over the apron and in contact therewith to receive the berries dislodged by the knocker wheel and carry the same rearwardly, side walls forming a chute from the knocker wheel towards the carrier, and means to drive the knocker wheel and the carrier.

3. In a machine for harvesting cranberries and the like, a vehicle, a frame mounted thereon for tilting movement in a vertical plane, a knocker wheel mounted at the forward end of the tilting frame and provided with a plurality of series of radial teeth to comb the bushes, a cleaning wheel also carried by the frame and provided with radial blades intermeshing the teeth of the knocker wheel to separate any débris therefrom, an apron disposed at an upward inclination to the rear of the knocker and cleaning wheels, a carrier moving to the rear over the apron to receive the berries dislodged by the knocker wheel and carry the same rearwardly, side walls forming a chute from the knocker wheel towards the carrier, and means to drive the knocker wheel and the carrier.

4. In a machine for harvesting cranberries and the like, a vehicle, a frame mounted thereon for tilting movement in a vertical plane, a knocker wheel mounted at the forward end of the tilting frame and provided with a plurality of longitudinal series of forwardly curved radial teeth closely spaced in the series to comb the bushes, a cleaning wheel also carried by the frame adjacent the knocker wheel and provided with radial blades spaced apart in staggered relation and intermeshing the teeth of the knocker wheel to separate any débris therefrom, an apron disposed at an upward inclination to the rear and behind the knocker and cleaning wheels, a belt and slat carrier moving over the apron to receive the berries dislodged by the knocker wheel and carry the same rearwardly, screened side walls of the frame and vehicle body forming a chute converging from the knocker towards the the carrier, and means to drive the knocker and cleaning wheels and the carrier.

5. In a machine for wet harvesting of cranberries and the like, a boat, a frame mounted thereon for tilting movement in a vertical plane, a knocker wheel carried by the forward end of the frame and provided with radial teeth to comb the bushes beneath the surface of the water, an apron disposed at an upward inclination behind the knocker wheel, a carrier moving to the rear over the apron to receive the berries dislodged by the knocker wheel and carry the same rearwardly, and means to drive the knocker wheel and the carrier.

6. In a machine for wet harvesting of cranberries and the like, a boat, a frame mounted thereon for tilting movement in a vertical plane, a knocker wheel carried by the forward end of the frame and provided with radial teeth to comb the bushes beneath the surface of the water, a cleaning wheel also carried by the frame and provided with radial blades spaced apart in staggered relation and intermeshing the teeth of the knocker wheel to separate any débris therefrom, an apron disposed at an upward inclination behind the knocker and cleaning wheels and having its forward end slotted and extending beneath the water, a belt and slat carrier moving to the rear over the apron to receive the berries dislodged by the knocker wheel and carry the same rearwardly, screened side walls of the frame and boat forming a chute converging from the knocker wheel towards carrier, and means to drive the knocker and cleaning wheels and the carrier.

7. In a machine for wet harvesting cranberries and the like, a boat, a frame pivoted in its medial portion to the boat for tilting movement in a vertical plane, means for adjustably securing the rear end of the frame to determine the elevation of its forward end, a knocker wheel mounted on the forward end of the frame and provided with a plurality of longitudinal series of radial teeth closely spaced in the series to comb the brushes beneath the surface of the water, a cleaning wheel also mounted on the frame adjacent the knocker wheel and provided with radial blades spaced apart in staggered relation and intermeshing the teeth of the knocker wheel to separate any débris therefrom, an apron disposed at an upward inclination behind the knocker and cleaning wheels and having its forward end extending beneath the surface of the water and and slotted to permit the water to pass therethrough while retaining the berries, a belt and slat conveyer moving upwardly and to the rear over the apron to receive the floating berries dislodged by the knocker wheel and carry the same rearwardly, screened side walls of the frame and of the boat forming a chute converging from the knocker wheel towards the carrier, means to drive the knocker and cleaning wheels and the carrier.

8. In a machine for harvesting cranberries and the like, a vehicle, a knocker wheel associated therewith and provided with radial teeth to comb the brushes rearwardly, an apron disposed at the rear of the knocker wheel, a carrier moving to the rear over the apron and in contact therewith to receive the berries dislodged by the wheel and carry the same rearwardly, and means to drive the knocker wheel and the carrier.

9. In a machine for harvesting cranberries and the like, a vehicle, a knocker wheel associated therewith including a plurality of angularly spaced wheel frame extension members which are parallel to but spaced from the axis of said wheel, and radial teeth spaced along said extension members and projecting outwardly therefrom to comb the bushes rearwardly when at the lowest point in their rotation, an apron disposed at the rear of the knocker wheel, a carrier moving to the rear over the apron and in contact therewith to receive the berries dislodged by the wheel and carry the same rearwardly, and means to drive the knocker wheel and the carrier.

10. In a machine for harvesting cranberries and the like, a vehicle, a knocker wheel associated therewith including a plurality of angularly spaced wheel frame extension members which are parallel to but spaced from the axis of said wheel, and radial teeth spaced along said extension members and projecting outwardly therefrom to comb the bushes rearwardly when at the lowest point in their rotation, an apron disposed at the rear of the knocker wheel, a carrier moving to the rear over the apron and in contact therewith to receive the berries dislodged by the wheel and carry the same rearwardly, and means associated with the vehicle for adjusting the height of the knocker wheel relative thereto.

11. In a machine for wet harvesting of cranberries and the like, a vehicle, a knocker wheel associated therewith and provided with radial teeth to comb the bushes rearwardly beneath the surface of the water, an apron disposed at an upward inclination behind the knocker wheel and having its forward end slotted and extending beneath the water, a belt and slat conveyor moving to the rear over the apron and in contact therewith to receive the berries dislodged by the wheel and deliver the same, and means to drive the knocker wheel and the carrier.

12. In a machine for wet harvesting of cranberries and the like, a vehicle, a knocker wheel associated therewith and provided with radial teeth to comb the bushes rearwardly beneath the surface of the water, an apron disposed at an upward inclination beyond the knocker wheel and having its forward end slotted and extending beneath the water, a belt and slat conveyor moving to the rear over the apron and in contact therewith to receive the berries dislodged by the wheel and deliver the same, a chute provided with oppositely disposed walls extending from either side of the knocker wheel to the corresponding side of the carrier, and means to drive the knocker wheel and the carrier.

GEORGE CHARLES GEBHARDT.

Witnesses:
W. J. ODEY,
L. M. HARPOLD.